Dec. 10, 1940. J. G. BOWER 2,224,136
RAILWAY CAR TRUCK
Filed Feb. 18, 1938 5 Sheets-Sheet 1

Dec. 10, 1940.   J. G. BOWER   2,224,136
RAILWAY CAR TRUCK
Filed Feb. 18, 1938   5 Sheets-Sheet 2
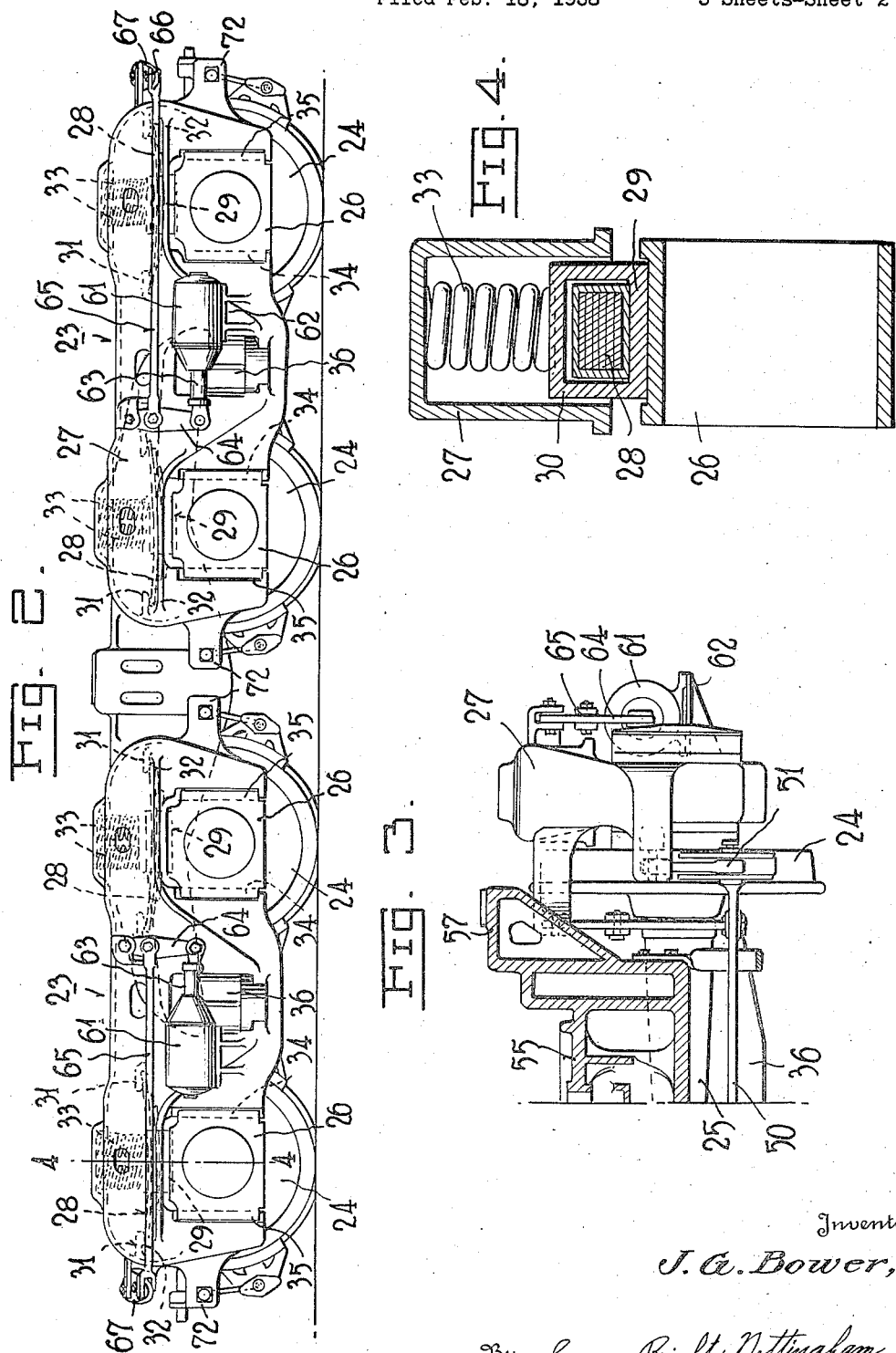
Inventor
J. G. Bower,
By Seymour, Bright & Nottingham
Attorneys Dec. 10, 1940. J. G. BOWER 2,224,136
RAILWAY CAR TRUCK
Filed Feb. 18, 1938 5 Sheets-Sheet 3
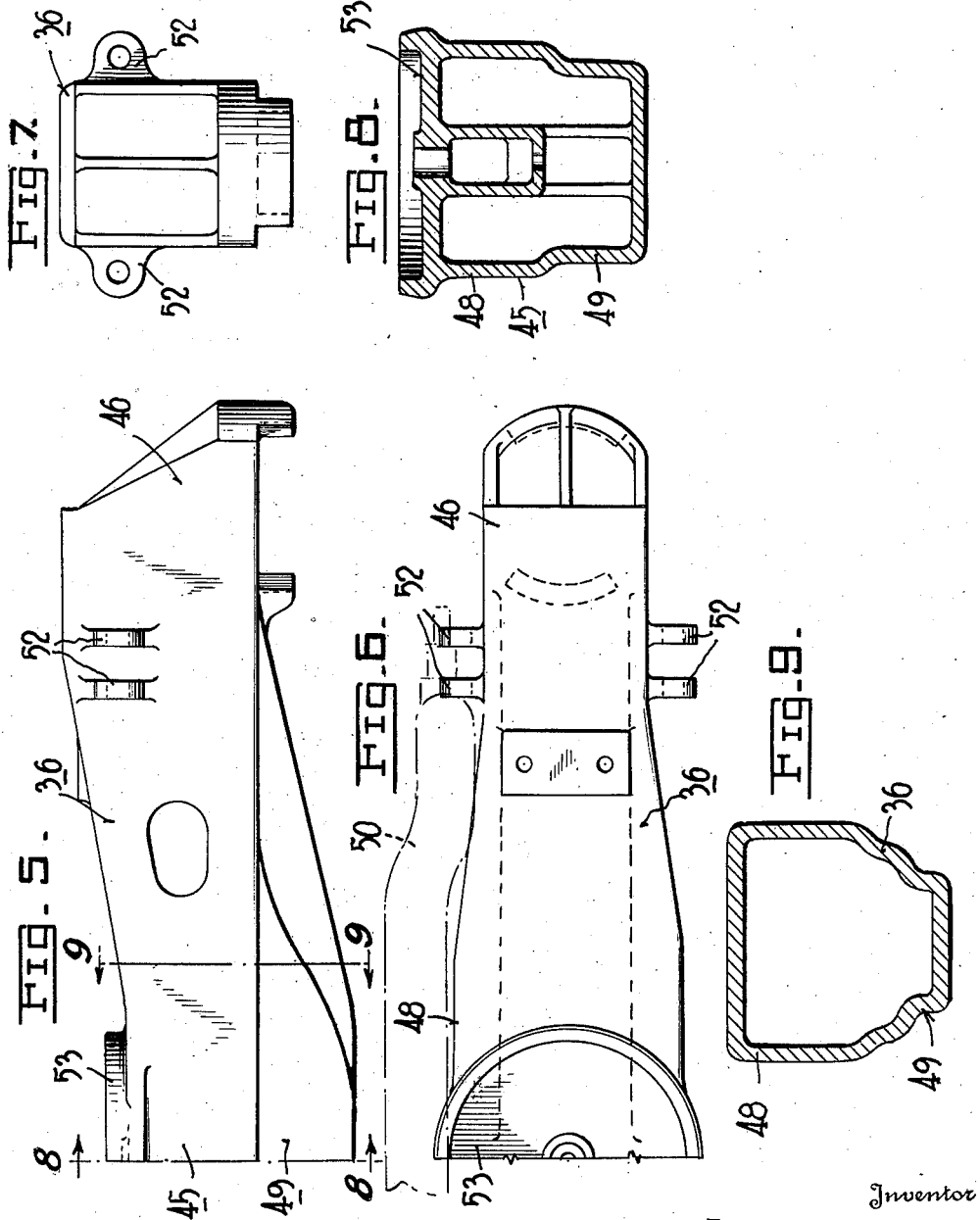
Inventor
J. G. Bower,
By Seymour, Bright & Nottingham
Attorneys

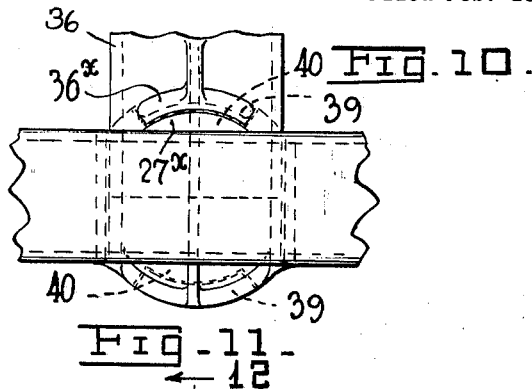
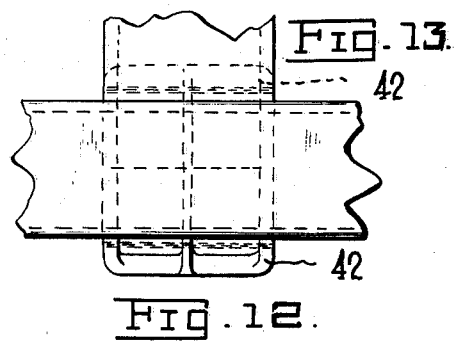
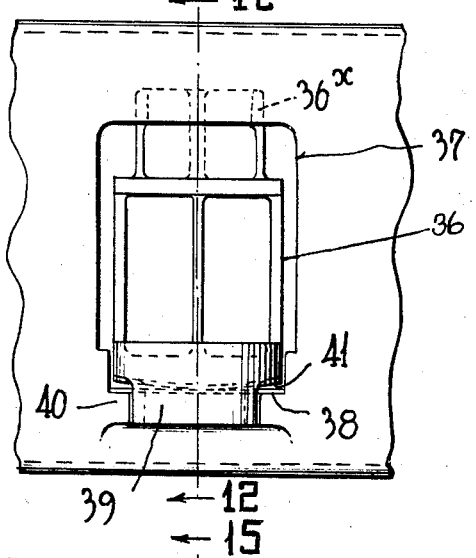
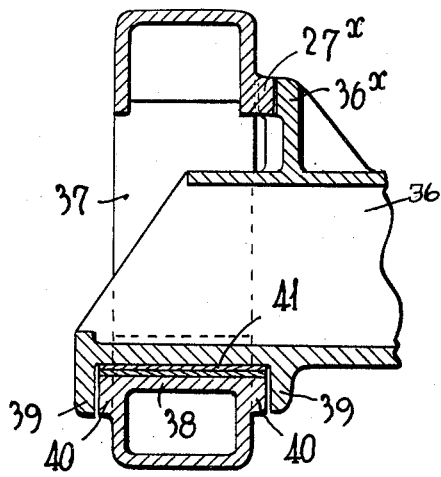
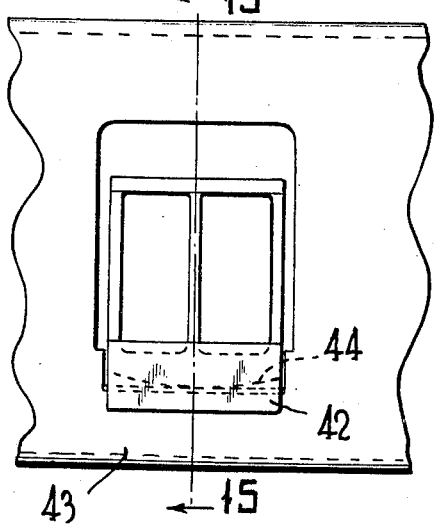
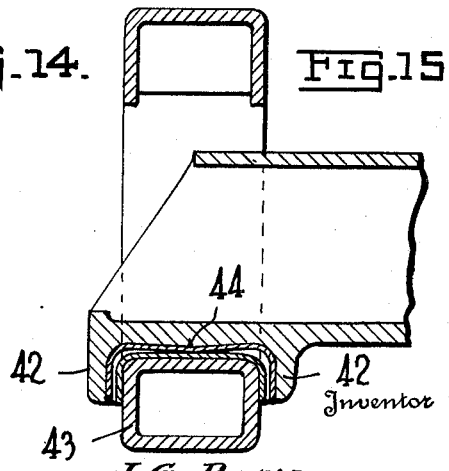

Dec. 10, 1940.  J. G. BOWER  2,224,136
RAILWAY CAR TRUCK
Filed Feb. 18, 1938   5 Sheets-Sheet 5
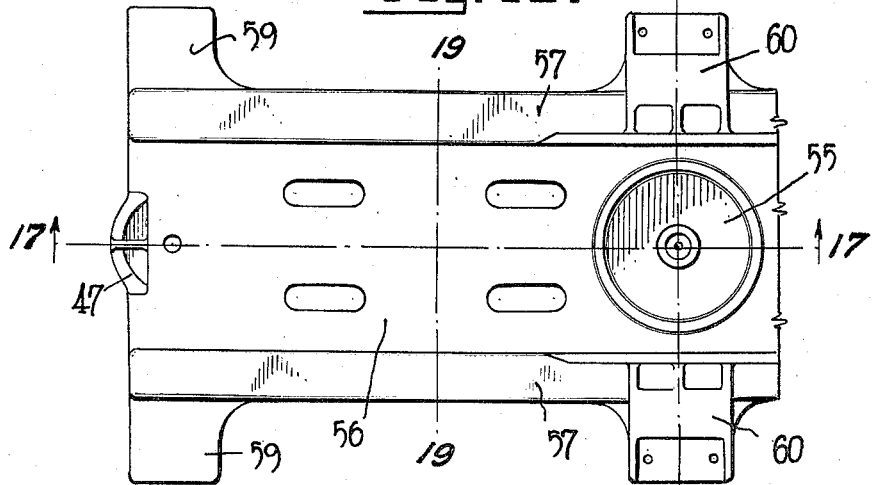
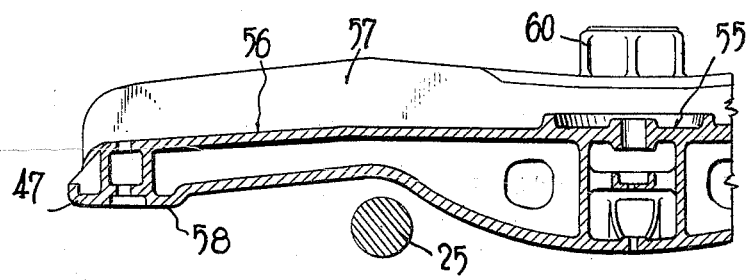
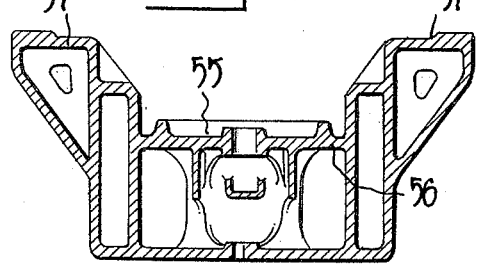
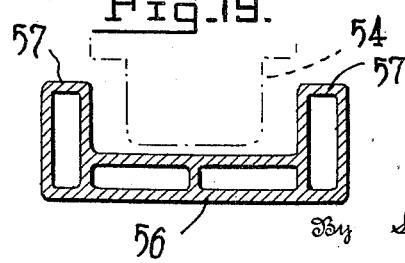
Inventor
J. G. Bower,
By Seymour, Bright & Nottingham
Attorneys Patented Dec. 10, 1940

2,224,136

UNITED STATES PATENT OFFICE 2,224,136

RAILWAY CAR TRUCK

Jerome G. Bower, New York, N. Y., assignor to The Buckeye Steel Castings Company, Columbus, Ohio Application February 18, 1938, Serial No. 191,308

12 Claims. (Cl. 105—183)

This invention relates to improvements in railway car trucks and more particularly to a novel eight-wheel truck construction.

At the present time, heavier equipment and higher train speeds make it desirable to decrease the load concentrations at the wheels, and this situation is leading to the development of trucks using more wheels and axles per truck. Lighter wheel loads result in greater economy and efficiency due to reduced maintenance cost, especially in high speed service.

The primary purpose of the present invention is to furnish a novel truck using more wheels and axles per truck than generally used heretofore.

Other objects are to provide novel means for mounting the side frames on the journal boxes; the transverse bolsters on the side frames; the span bolster on the transverse bolsters; and by braking equipment on the new truck.

A further object is to supply in equipment of this character, novel transverse bolsters and a novel span bolster, as well as improved braking equipment.

With the foregoing objects outlined and with other objects in view which will appear as the description proceeds, the invention consists in the novel features hereinafter described in detail in connection with the accompanying drawings and more particularly pointed out in the appended claims.

In the drawings:

Fig. 2 is a side elevation of the same.

Fig. 3 is an end elevation of one truck unit partly in vertical section, the section being taken on the line 3—3 of Fig. 1.

Fig. 4 is a sectional view of a detail taken on the line 4—4 of Fig. 2, and illustrating the means employed for resiliently supporting a side frame on one of the journal boxes.

Fig. 5 is a side elevation of a half of one of the transverse bolsters.

Fig. 6 is a top plan view of the same.

Fig. 7 is an end view of the end portion of such bolster.

Figure 1:
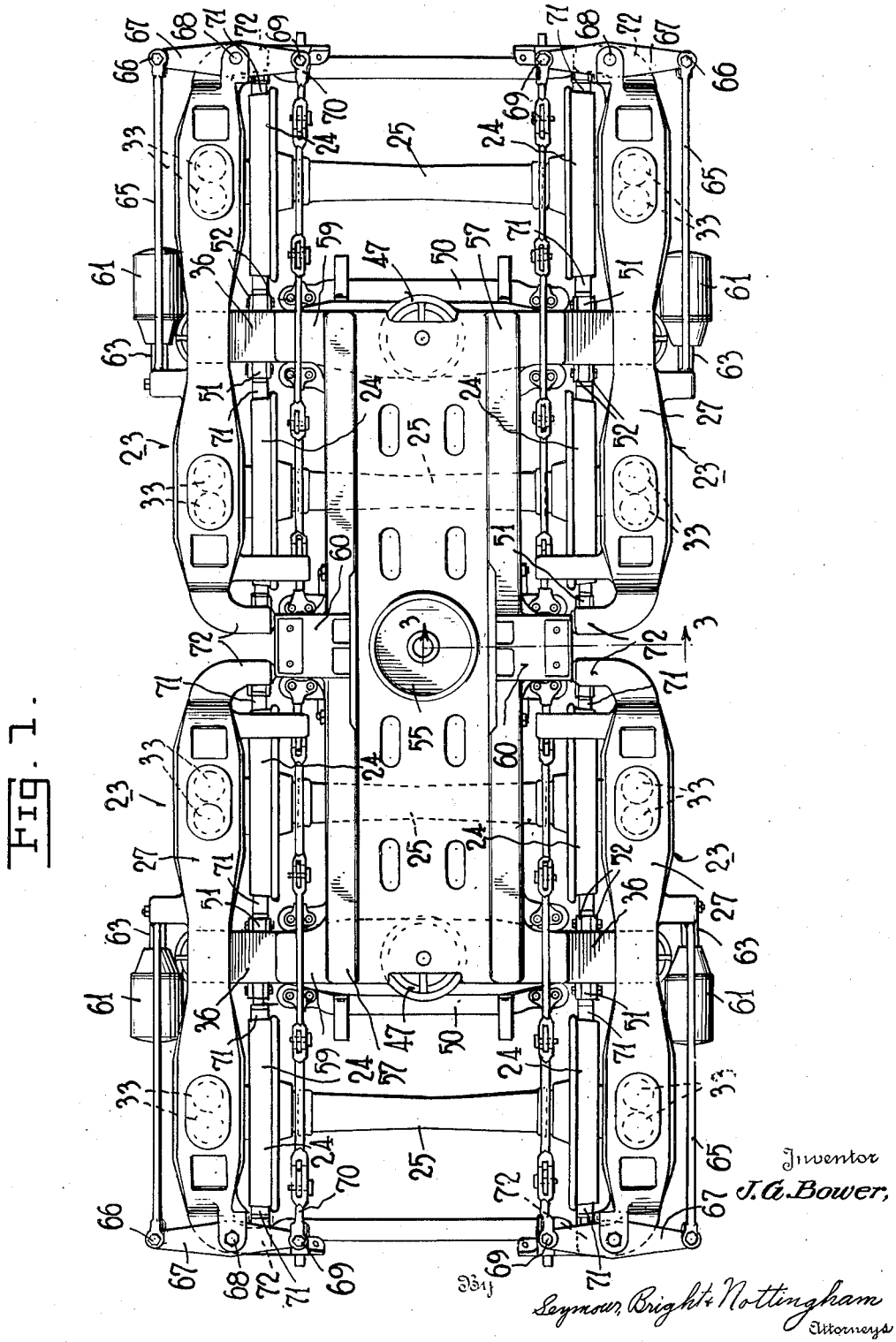
Fig. 1 is a top plan view of a preferred form of my improved truck.

Figs. 8 and 9 are transverse sectional views of the bolster taken respectively on the lines 8—8 and 9—9 of Fig. 5.

Figs. 10, 11 and 12 are details of the structure by which the ends of the transverse bolsters are mounted on and act to stabilize the side frames; Fig. 10 being a top plan view; Fig. 11, a side elevation; and Fig. 12, a vertical sectional view taken on the line 12—12 of Fig. 11.

Figs. 13, 14 and 15 are views like Figs. 10 to 12 inclusive, but illustrating another modification.

Fig. 16 is a top plan view of a portion of the span bolster.

Fig. 17 is a longitudinal, vertical, sectional view of the same taken on the line 17—17 of Fig. 16.

Figs. 18 and 19 are transverse vertical, sectional views taken respectively on the lines 18—18 and 19—19 of Fig. 16.

Referring to the drawings, 23 designates four-wheel truck units forming parts of my improved eight-wheel truck. In accordance with the invention, each of these units may consist of four wheels 24, supporting axles 25, which carry journal boxes 26. The journal boxes in turn support side frames 27.

I prefer to resiliently mount the side frames on the journal boxes, and this may be accomplished as illustrated in Figs. 1, 2 and 4. In this construction semi-elliptic springs 28 are supported upon seats 29 upon the tops of the journal boxes, and each seat, as best shown in Fig. 4, may consist of a rectangular, tubular casting 30 through which the springs 28 extend. The ends of the springs underlie supports 31 which may be integral with or secured to the side frame, and each support preferably has an arc-shaped bottom surface 32 for transferring a portion of the load from the vehicle through the spring 28 to the axle journal. Helical springs 33 of any suitable number rest on the tubular bearing castings 30 and extend vertically into the side frame members above the pedestal openings 34 to also aid in supporting the side frames. Obviously the side frames should preferably be hollow castings in order to take care of such construction. Each journal box 26 is slidably mounted within a pedestal opening 34, and is provided with flanges 35 which embrace the vertical portions of the side frame pedestal opening, thereby guiding the journal box within the opening. Although Figs. 1 and 2 show two helical springs over each journal box, it is manifest that the design is readily adaptable for the use of one or more helical springs.

When springs are provided at the pedestal openings of the side frame members as described above, it is unnecessary to provide resilient mountings between the transverse bolsters 36 and the side frames, and obviously this permits the transverse bolsters to be arranged lower than would be the case if they were supported directly by springs. As best illustrated in Figs. 10, 11 and 12, each end of each transverse bolster 36 extends into a bolster opening 37 in the side frame, and such end is mounted directly upon a seat 38 formed on the side frame at the bottom of the opening 37. The engagement between the bolster and side frame is arranged for limited angular motion in a horizontal plane as shown by the cooperating arc-shaped portions 39 and 40 on the frame and bolster. Obviously these arc-shaped portions are struck from a common center to allow for the desired turning movement. Provision is also made for vertical angular motion between the frame and bolster members by providing an arc-shaped seat portion 41 on either of these members. In the structure illustrated, the seat or face 41 is illustrated as arranged at the bottom of the bolster.

The construction shown in Figs. 10, 11 and 12 may be further modified by providing means for maintaining vertical alignment of the side frames when they are acted upon by brake forces which might tend to lean the side frames inwardly at the top. For maintaining the vertical alignment of the side frames, I provide each end of the transverse bolster with an arcuate bracket 36x which engages a corresponding arcuate pad 27x on the side frame. The arc of the bracket and pad is concentric with the arc-shaped portions 39 and 40.

The construction illustrated in the modification shown in Figs. 13 to 15 inclusive is the same as that shown in Figs. 10 to 12 except that the arc-shaped portions (39, 40) allowing horizontal rotation, are omitted, and angular motion in a horizontal plane between the frame and bolster is permitted by the looseness of the fit between the depending flanges 42 on the bolster and the bottom member 43 of the side frame. In order to accommodate relative angularity between the frame and the bolster in all vertical planes, the bearing surface between the frame and bolster members is of spherical shape as shown at 44. This spherical portion may be provided on either the side frame or the bolster, but is shown on the bolster.

In heavy railway equipment, as would be the case in any such vehicle, it is desirable to keep the center of gravity of the entire structure as low as possible. To this end the transverse bolsters and span bolster of my improved truck are especially designed. As best illustrated in Figs. 5 to 9 inclusive, each transverse bolster is of novel construction for the following reasons:

The central or medial portion 45 is depressed relative to the end portions 46 in order to accommodate the low pivotal connection with the span bolster 47 (see Fig. 1). The central portion of each transverse bolster, as best illustrated in Figs. 6, 8 and 9, is made wide at the top as shown at 48, in order to provide transverse strength, and narrow at the bottom 49 in order to clear the clasp brake beams 50 (Figs. 1 and 3) in "brakes released" position. The end portions 46 of the transverse bolsters are made deep to provide vertical strength and narrow to clear brake hangers 51, and brake heads of the clasp brake beams, thus providing minimum length of wheel base. This is in contradistinction to bolsters of the conventional type which are made wide and shallow at the end portions. Each end portion of each transverse bolster is preferably provided with brackets 52 for suspension of the brake hangers.

The medial portion of each transverse bolster also forms a pivotal bearing 53 to support the span bolster and provide for turning.

Vehicles of this nature require a rather deep central sill construction which extends longitudinally throughout the length of the vehicle, and which is diagrammatically shown at 54 in Fig. 19. In order to meet such conditions, the center plate 55 of a truck must be arranged as low as possible and provision must be made to clear the center sill construction without sacrificing strength in the truck members. Therefore, my span bolster is also of special construction, as best illustrated in Figs. 16 to 19 inclusive. By referring to those figures, it may be seen that due to the necessity of placing the span bolster 47 between the underside of the center sill 54 and the intermediate axles 25 of the truck that the lower the center sill, the more restricted is the space for the span bolster over the intermediate axles. In order to accommodate low center plate 55 and center sill construction, and still provide sufficient strength at all sections and especially at section 19—19 over the intermediate axles, the span bolster in transverse section is of U-shape and composed of a relatively shallow center portion 56, and with deep side portions 57.

The underside of each end of the span bolster is provided with a pivotal bearing 58, which is supported by a pivotal bearing 53 of a transverse bolster. In order to provide sufficient structural strength in the span bolster at its ends, and at the same time provide clearance for low center sill construction, the pivotal bearings 53 on the transverse bolsters of each four-wheel unit must, as heretofore stated, be made lower than is customary in the conventional four-wheel truck.

The span bolster has end transverse girders 59 to cooperate with the transverse bolsters in supporting the load, and the medial portion of the span bolster forms a transverse girder 60 to cooperate with the body of the vehicle in supporting the latter.

My improved truck is also designed to accommodate braking mechanism of the clasp type and includes air or fluid cylinders 61. The application of air cylinders to the truck reduces weight and leads to greater economy and efficiency, and lowers maintenance cost by eliminating the system of pull rods and levers necessary to transmit the force of the air to the truck brake system when the air cylinder is mounted on the body of the vehicle, as has been customary in the past.

In accordance with the present invention, four air cylinders per eight wheel truck are used—one on each side frame of the truck. For this purpose each side frame member is provided with an outside bracket or shelf 62 on which the cylinder is rigidly secured. The air in each cylinder operates the clasp brake leverage system for one side of a four-wheel unit. The air cylinder piston rod 63 is pivotally connected to the lower end of a lever 64 that is suspended at its upper end from a portion of the side frame. The medial portion of each lever 64 is pivotally connected to one end of a pull rod 65, the opposite end being pivotally connected at 66 to the outer end of inclined lever 67. The inclined levers are arranged at the ends of the eight-wheel truck, and each lever is pivotally supported at its medial portion at 68 by an end of a side frame member. The other or inner ends of the inclined levers are pivotally connected at 69 to the outer ends of links 70 of the clasp brake leverage system.

When air or other fluid pressure is introduced into the cylinders, the piston rods 63 cause the levers 64 to pull the rods 65 toward the medial portion of the eight-wheel truck, and this results in the pulling of the links 70 of the brake leverage system, thereby applying the brake shoes 71 to the wheels 24.

It will be noted that since each of the four air cylinders on the eight-wheel truck operates the brakes on one side of a four-wheel unit only, the failure of any one of the air cylinders would affect the operation of the brakes on only one quarter of the truck. That is, the failure of an air cylinder in this type of application would not be as serious as the failure of a cylinder in a body brake application.

It will also be noted, due to the construction of my improved eight-wheel truck that the ends of each side frame member may be provided with extensions 72 to form end brake hanger brackets for the application of clasp brakes.

While I have disclosed what I now consider to be a preferred embodiment of the invention and some practical examples of modifications, I wish it understood that changes may be made in the details disclosed without departing from the spirit of the invention as expressed in the claims.

What I claim and desire to secure by Letters Patent is:

1. In a car truck, a plurality of truck units, each unit, having a transverse bolster with a depressed central portion, and a span bolster pivotally connecting said transverse bolsters, the span bolster being of substantially U-shape in transverse vertical section from end to end and having relatively widely spaced upstanding portions adapted to extend along opposite sides of the center sill structure of a car body, the medial portion of each transverse bolster being wider than its end portions, and the lower portion of said wider portion being narrower than the upper portion thereof.

2. In a car truck, a plurality of truck units, each unit having a transverse bolster with a depressed central portion, and a span bolster pivotally connecting said transverse bolsters, the under-surface of the span bolster being of substantially undulated shape to accommodate the axles of the units and to deepen the medial portion of the span bolster, the span bolster being of substantially U-shape in transverse vertical section from end to end and having relatively widely spaced upstanding portions adapted to extend along opposite sides of the center sill structure of a car body.

3. In a car truck, a plurality of truck units, each unit having a transverse bolster with a depressed central portion, and a span bolster pivotally connecting said transverse bolsters, the span bolster being of substantially U-shape in transverse vertical section from end to end, the upstanding portions of said U-shaped section being relatively widely spaced so as to accommodate the center sill structure of a car body.

4. In a car truck, a plurality of truck units, each unit having a transverse bolster with a depressed central portion, and a span bolster pivotally connecting said transverse bolsters, the medial portion of each transverse bolster being wider than the ends thereof, and the span bolster being of substantially U-shape in transverse vertical section, the upstanding portions of said U-shaped section being relatively widely spaced so as to accommodate the center sill structure of a car body.

5. In a car truck, a plurality of truck units, each unit having a transverse bolster with a depressed central portion, and a span bolster pivotally connecting said transverse bolsters, the medial portion of each transverse bolster being wider than the ends thereof, and the span bolster being of substantially U-shape in transverse vertical section, the upstanding portions of said U-shaped section being relatively widely spaced to accommodate the center sill structure of a car body, the pivotal bearing of the span bolster being arranged in the bottom portion of the U.

6. A car truck comprising a plurality of truck units each having opposite side frames with a transverse bolster extending between its side frames and resting directly on the latter by means of articulated joints, and a span bolster having its ends pivotally connecting the transverse bolsters of the units, the span bolster being of substantially U-shape in transverse vertical section from end to end and having relatively widely spaced upstanding portions adapted to extend along opposite sides of the center sill structure of a car body.

7. A car truck comprising a plurality of truck units each having opposite side frames with a transverse bolster extending between its side frames and resting directly on the latter by means of articulated joints, and a span bolster having its ends pivotally connecting the transverse bolsters of the units, the span bolster being of substantially U-shape in transverse vertical section from end to end and having relatively widely spaced upstanding portions adapted to extend along opposite sides of the center sill structure of a car body, one of the articulated joints comprising complementary arc-shaped surfaces on one of the transverse bolsters and one of the side frames.

8. A car truck comprising a plurality of truck units each having opposite side frames with a transverse bolster extending between its side frames and resting directly on the latter by means of articulated joints, and a span bolster having its ends pivotally connecting the transverse bolsters of the units, the span bolster being of substantially U-shape in transverse vertical section from end to end and having relatively widely spaced upstanding portions adapted to extend along opposite sides of the center sill structure of a car body, one of the articulated joints permitting one of the transverse bolsters to rock vertically on one of the side frame members.

9. A car truck comprising a plurality of truck units each having opposite side frames with a transverse bolster extending between its side frames and resting directly on the latter by means of articulated joints, and a span bolster having its ends pivotally connecting the transverse bolsters of the units, one of the articulated joints comprising a spherical surface provided on the bottom of the transverse bolster, an engaging horizontal surface provided on the side frame and permitting the transverse bolsters to rock vertically and universally on the side frame, and depending lugs provided on the bottom of the transverse bolster and embracing the side frame member to limit the relative transverse movement of the side frame and bolster.

10. A car truck construction comprising a side frame member having a bolster opening, a transverse bolster extending into said opening, and resting directly on the side frame by means of an articulated joint, said joint comprising depending arc-shaped brackets provided on the bottom of the bolster and an upstanding arc-shaped bracket provided on the top of the bolster, arc-shaped surfaces provided on the vertical side walls of the side frame and engageable with said arc-shaped brackets, an arc-shaped surface provided on the bottom of the bolster between the depending brackets, a horizontal surface provided on the side frame engaging the arc-shaped surfaces and brackets permitting the side frame and bolster to rock relatively horizontally and vertically a predetermined amount.

11. In a car truck, a plurality of truck units, each unit comprising opposite side frames and a transverse bolster with a depressed central portion supported directly on said frames by means of articulated mountings, a span bolster connecting said transverse bolsters, the span bolsters being of substantially U-shape in transverse vertical section from end to end, the upstanding portions of the said U-shaped section being relatively widely spaced so as to accommodate the center sill structure of a car body.

12. In a truck construction of the character described, wheel-supported axles, boxes in which the axles are journaled, a pair of side frame members arranged at each side of the truck construction and slidable vertically relatively to the journal boxes at that side of the truck construction, spring means for supporting the side frame members on the journal boxes, transverse bolsters having their ends resting directly on side frame members at opposite sides of the truck construction, each transverse bolster having a depressed central portion, and a span bolster having its ends resting on the depressed central portions of the transverse bolster and pivotally connected to the latter, said span bolster being substantially U-shape in transverse section from end to end to accommodate the center sill structure of a car body.

JEROME G. BOWER.